Nov. 1, 1955          J. GRECO          2,722,153
MUSICAL EATING UTENSIL
Filed March 17, 1953
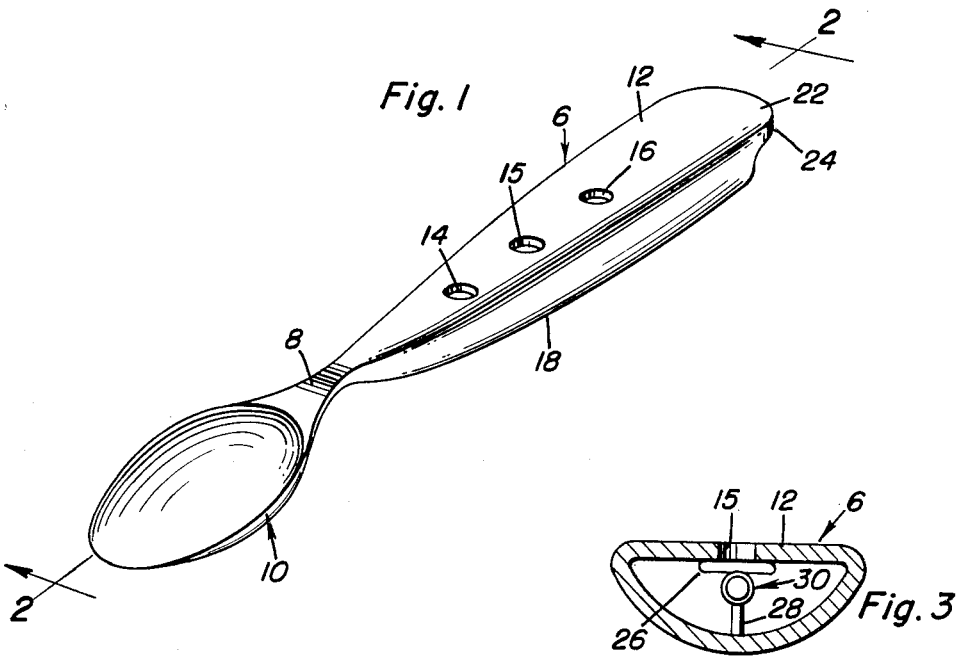
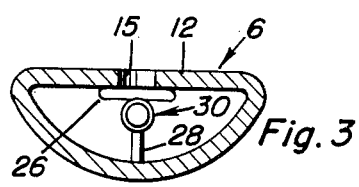
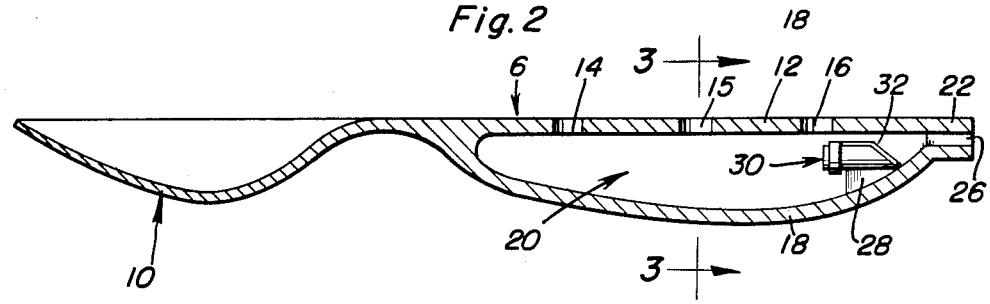
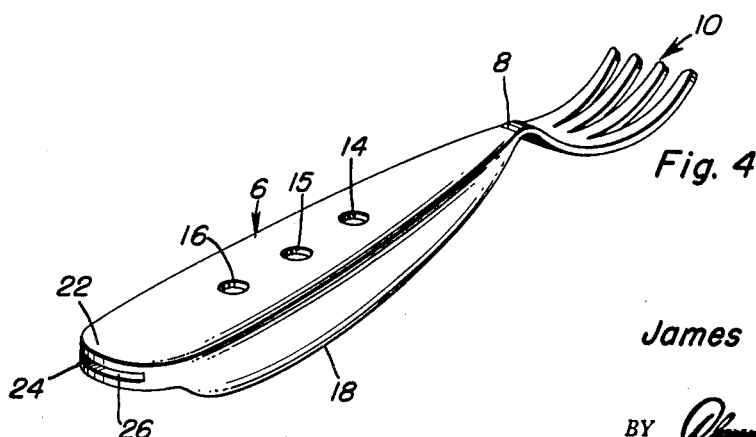
James Greco
INVENTOR.

United States Patent Office 2,722,153
Patented Nov. 1, 1955

2,722,153

MUSICAL EATING UTENSIL

James Greco, Chicago, Ill., assignor of 50 per cent to Fred Greco, Chicago, Ill.

Application March 17, 1953, Serial No. 342,802

2 Claims. (Cl. 84—375)

The present invention relates to eating utensils, generally speaking, and has more particular reference to one which may be more aptly designated as either a fork, knife or spoon and particularly one which is essentially adapted to be used by small children learning to eat with the aid of the several types of implements specified.

It is a matter of common knowledge that often exasperated mothers and others who attempt to teach young ones behavior patterns and manners in respect to eating with conventional table utensils are called upon to resort to all sorts of mannerisms and attention getting devices in so doing. It is not the purpose here, however, to dwell on these numerous and amusing techniques other than to say that the subject matter of the instant endeavour is one wherein the principle of amusement is invoked and is, as a matter of fact, one which has to do with incorporating a toy musical instrument, of fife-like form, in the handle portion of a utensil such as a fork, a spoon or the like.

The object of the invention is, of course, to provide a simple, economical and fun provoking structural entity in which the handle performs its usual handling function but is unique in that it is hollow, especially shaped in an exterior manner and provided with the required air inlet and outlet holes, making it possible to utilize a simple device, such as a so-called tin whistle, to enable the child user to amuse himself while attending to the task of eating his meal.

More specifically, the invention appertains to a novel article of manufacture which is generally referred to as an eating implement or utensil used by a child and which comprises a hollow handle having a utility head at one end and flattened in shape at its opposite end, the hollow portion of the handle providing a tone chamber and at least one wall of the latter having a plurality of selectively usable tone holes adapted to be covered with the user's fingers as is done when one plays a fife, said flattened end being bored and providing an air feeding mouthpiece, and air pressure responsive sound producing means mounted in said chamber in alignment with said mouthpiece.

Other objects, features and advantages will become more readily apparent in the following description and the accompanying sheet of drawings.

In the accompanying drawings wherein like numerals are employed to designate like parts throughout the same:

Figure 1 is a perspective view of a musical spoon as constructed in accordance with the principles of the present invention.

Figure 2 is a central longitudinal sectional view taken on the line 2—2 Figure 1, looking in the direction of arrows and with the whistle appearing in elevation.

Figure 3 is a cross-section on the line 3—3 of Figure 2, looking in the direction of the arrows.

Figure 4 is a perspective view similar to Figure 1 showing the invention incorporated in a fork.

By way of introduction to the detailed description it is to be pointed out that the subject matter of the invention is broadly comprehended in the sense that it is either a musical eating utensil or article of manufacture which may be described as an implement in which facilities are provided for eating and amusing the user.

Referring now to the drawings, the numeral 6 designates a suitable light weight small sized handle of appropriate materials having a shank at one end and a head at the end of the shank. The head may be either a knife, fork or spoon but in Figure 1 it is shown as a spoon and in Figure 4 it is shown as a fork. The construction of the "head" in so far as the overall novelty is concerned is inconsequential.

The handle is elongated and hollow and is therefore said to be tubular in cross-section. The top side is perfectly flat, as at 12, and is provided at longitudinally spaced points with apertures which may be conveniently described here as either vents or so-called tone holes 14, 15 and 16. The side and bottom walls are dished to form a sort of concavo-convex portion 18 which in turn defines the air trapping amplifying tone chamber 20. The inlet end of the chamber, more specifically the right-hand end of the handle, is flattened as in 22, convexly rounded off as at 24 and is slotted or bored as at 26 to form a convenient mouthpiece. The opening or hole is sometimes referred to in connection with musical instruments as a blow hole. There is a vertical support member 28 on the interior of the tone chamber and in line with the central portion of the blow hole and this is provided with a suitable so-called tin whistle 30 which may be a suitable tube and a vibratory reed or tongue 32 therefor. By forcibly blowing the whistle in an obvious fashion and opening and closing the tone holes with the fingers in fife-like fashion simple tunes may be played either by the mother, attendant or the child himself and to in this manner provoke considerable amusement, sufficient in many instances to distract the child so that he may go on eating his meal while somewhat simultaneously amusing himself with his noise provoking spoon, or fork, as the case may be.

The instrumentality is a unique structural entity in which the component elements contribute with requisite nicety and in a proportionate manner to an over-all improved result, that is, an amusement type utensil unique in that it has a musical instrument, so called, built into the handle thereof. Alternatively, the subject matter of invention may be treated as a musical instrument with utensil means carried thereby.

From the foregoing, the construction and operation of device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. As a new article of manufacture, a musical eating utensil for use by a child comprising a hollow handle having a utensil head at one end and flattened in shape at its opposite end, the hollow portion of the handle providing a tone chamber and at least one wall of the latter having a plurality of selectively usable tone holes adapted to be covered with the user's fingers as is done when one plays a fife, said flattened end being of restricted cross-section, bored and providing an air feeding mouthpiece, and air pressure responsive sound producing means mounted in said chamber in alignment with said mouthpiece, said sound producing means embodying a reed-equipped-whistle arranged in alignment with said mouthpiece, longitudinally disposed in respect to the lengthwise axis of the handle and supported in elevated position by support means attached to the interior surface of the bottom of the tone chamber.

2. As a new article of manufacture, a musical eating spoon for use by a child comprising a spoon bowl provided with a handle, said handle being elongated and hollow, the top side being perfectly flat and provided at longitudinally spaced points with apertures constituting selectively usable tone holes, the side and bottom walls being dished to form a concavo-convex portion which in turn defines an air trapping amplifying tone chamber, the inlet end of said chamber having a restricted air slot and being flattened and the transverse edge being convexly rounded to provide a safely usable mouthpiece, a vertical support member on the interior of the tone chamber in line with the central portion of the air slot in said mouthpiece, and a tin whistle supported on said support member in line with said air slot.

References Cited in the file of this patent

UNITED STATES PATENTS

| | | |
|---|---|---|
| 1,189,897 | Wilkes | July 4, 1916 |
| 2,126,858 | Zadek | Aug. 16, 1938 |
| 2,209,427 | Swanson | July 30, 1940 |
| 2,229,322 | Berlin | Jan. 21, 1941 |
| 2,598,268 | Kendrick | May 27, 1952 |